United States Patent

Ueki

[11] Patent Number: 5,845,959
[45] Date of Patent: Dec. 8, 1998

[54] SLIDE TILT ROOF APPARATUS

[75] Inventor: Shigeru Ueki, Higashi-Hiroshima, Japan

[73] Assignee: Daikyo-Webasto Co., Ltd., Higashi-Hiroshima, Japan

[21] Appl. No.: 783,250

[22] Filed: Jan. 14, 1997

[30] Foreign Application Priority Data

Jan. 8, 1996 [JP] Japan ................................. 8-001052

[51] Int. Cl.$^6$ ........................................................ B60J 7/05
[52] U.S. Cl. .......................................... 296/221; 296/223
[58] Field of Search .................................... 296/221, 222, 296/223

[56] References Cited

U.S. PATENT DOCUMENTS 4,995,665  2/1991  Ichinose ............................. 296/221 X
5,718,472  2/1998  Otake et al. ............................ 296/221

FOREIGN PATENT DOCUMENTS 141329  5/1990  Japan ..................................... 296/222

*Primary Examiner*—Dennis H. Pedder
*Attorney, Agent, or Firm*—Sixbey, Friedman, Leedom & Ferguson; David S. Safran

[57] ABSTRACT

A slide tilt roof apparatus in which an engagement protiona to the rear end of a rising/falling link can be guided when the rising/falling link forwardly pivots and also when the link pivots up, whereby the posture of the rising/falling link can be changed by a single member, and the apparatus can be manufactured simply and easily is obtained. In particular, a panel (4) is upwardly tilted from a closed position of an opening portion (3) by a forward movement of a rising/falling link (9), downwardly tilted from the closed position by a forward tilt pivoting of the rising/falling link while moving it rearwardly, and can be moved to a fully open position by a rearward movement of the rising/falling link (9) from the tilt lowered position. An engagement portion (10) is provided on the rear side of the rising/falling link (9), and a rise/fall reataining portion (11) for rearwardly upwardly guiding the engagement portion (10) when the rising/falling link (9) forwardly tilt pivots and retaining the rising/falling link (9) is provided on a member which is longitudinally movable following the movement of the lifters (6), the rising/falling retaining portion (10) defining a guide surface (11A) for guiding the rising/falling link (9) forwardly downward so as to cause the link (9) to pivot into an erected state.

4 Claims, 5 Drawing Sheets

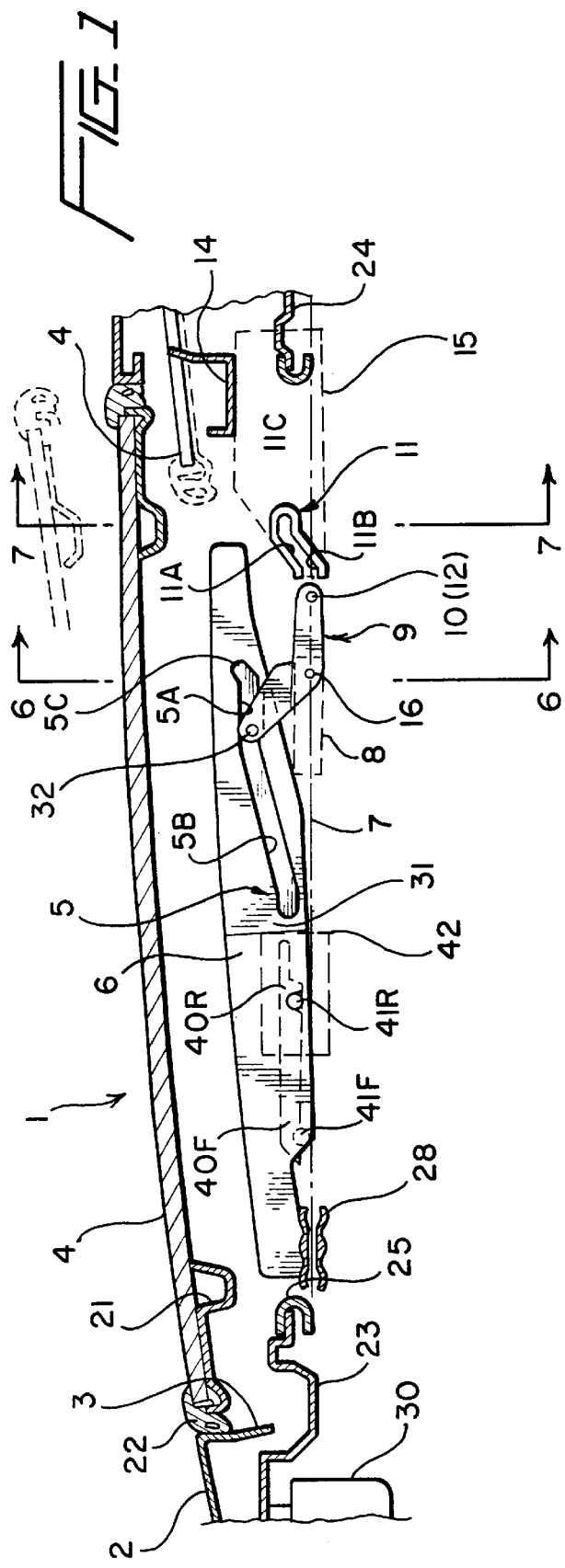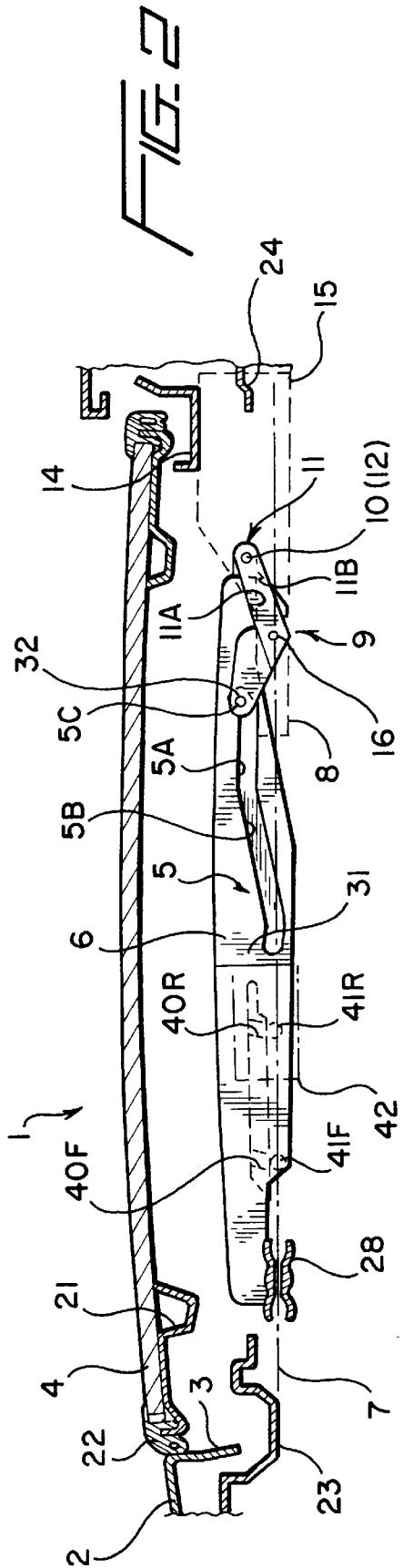

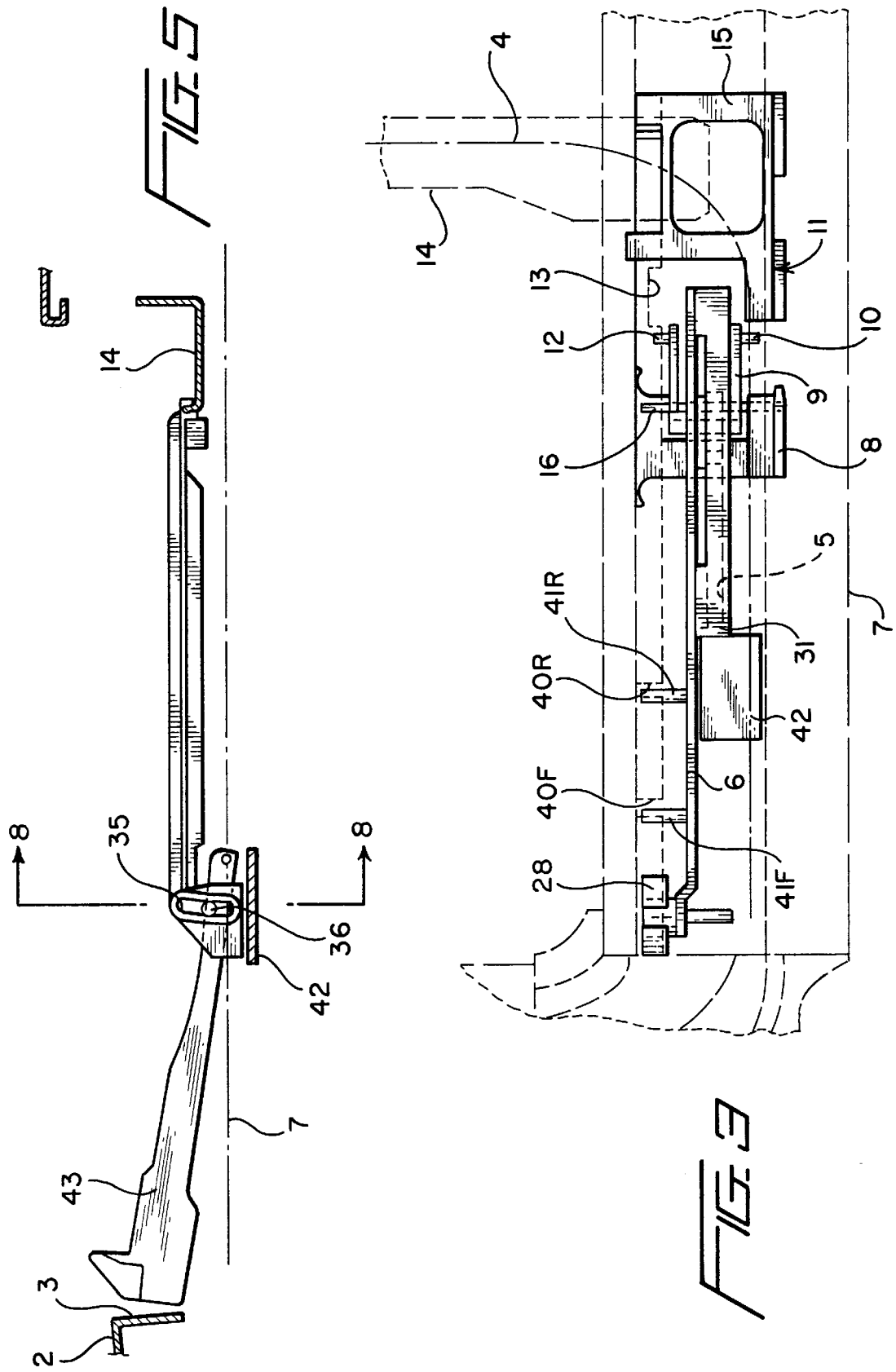

SLIDE TILT ROOF APPARATUS

BACKGROUND OF THE INVENTION

1. Technical Field of the Invention

The present invention relates to a slide tilt roof apparatus mounted on the roof of a vehicle such as an automobile

2. Prior Art

As disclosed in Japanese Unexamined Patent Publication No. HEX 7-164890, the prior art of this type is such that a pair of right and left lifters each having a rising/falling cam groove is provided on the inner face of a panel adapted to open/close an opening portion of a vehicle roof, right and left guide rails for longitudinally slidably guiding a front portion of the lifters are fixed to the vehicle roof side, a rising/falling link which is longitudinally movable by a slider is supported at its intermediate and rear end portions by each of the right and left guide rails, the front end of the rising/falling link slidably engages the rising/falling cam groove of each lifter, the panel is upwardly tilted from the closed position of the opening portion by a forward movement of the rising/falling link, downwardly tilted from the closed position of the opening portion by forwardly tilt pivoting the rising/falling link while rearwardly moving it, and can be moved to its fully opened position by a rearward movement of the rising/falling link from the tilt lowered position.

In this conventional apparatus, the forwardly tilt pivoting of the rising/falling link is achieved by rearwardly upwardly guiding the roller at the rear end thereof using a slope surface member fixed in each guide rail from the state guided by the guide rail so as to move the roller upwardly of the guide rail through a notch defined in the guide rail

PROBLEMS TO BE SOLVED BY THE INVENTION

Since the forwardly tilt pivoting movement of the rising/falling link is effected using the slope surface member fixed in the guide rail, the conventional apparatus requires an additional posture changing mechanism for causing the rising/falling link forwardly moving from the rear side to change its forwardly tilted posture to its erected posture. It also requires means for elastically pressing the roller against the guide rail. Thus, the apparatus is complicated and the manufacture thereof is difficult.

Further, the intermediate support supporting an intermediate portion of the rising/falling link can project in only one of rightward and leftward directions due to the provision of the slope surface member in the guide rail, which may sometimes result in the rising/falling link unstably supported.

SUMMARY OF THE INVENTION

The primary object of the present invention is to provide a slide tilt roof apparatus wherein a rise/fall retaining portion is provided on a member which is longitudinally movable following the movement of the corresponding lifter so that the engagement portion at the rear end of the rising/falling link can be guided when the rising/falling link forwardly tilt pivots and also when the link pivots to erect, whereby the posture of the rising/falling link can be changed by a single member and the apparatus can be manufactured simply and easily.

Another object of the invention is provide a slide tilt roof apparatus wherein the rising/falling link is provided on its rear end with a rear support adapted to slide in the corresponding guide rail and with the engagement portion adapted to move outside the guide rail which are separately disposed on the right and left sides, and the rise/fall retaining portion is mounted on a support member which is adapted to be guided by the guide rail on the side of each end of a drip rail, whereby the rising/falling link moving rearward can simply and assuredly guided and supported.

Further object of the invention is to provide a slide tilt roof apparatus wherein an intermediate support supporting an intermediate portion of the rising/falling link is formed into a rightwardly and leftwardly projecting shape, and both the right and left ends of the intermediate support are slidably guided by the guide rail, thereby ensuring the moving stability of the rising/falling link satisfactorily.

BRIEF DESCRIPTION OF THE DRAWINGS

FIG. 1 is a cross sectional view showing an embodiment of the present invention with its panel in a closed position;

FIG. 2 is also a cross sectional view of the embodiment with its panel in a tilt lowered position;

FIG. 3 is a plan view of essential portions of the embodiment;

FIG. 5 is a side view showing a drip rail cooperative means and a deflector;

DETAILED DESCRIPTION OF THE PREFERRED EMBODIMENT

Figure 4:
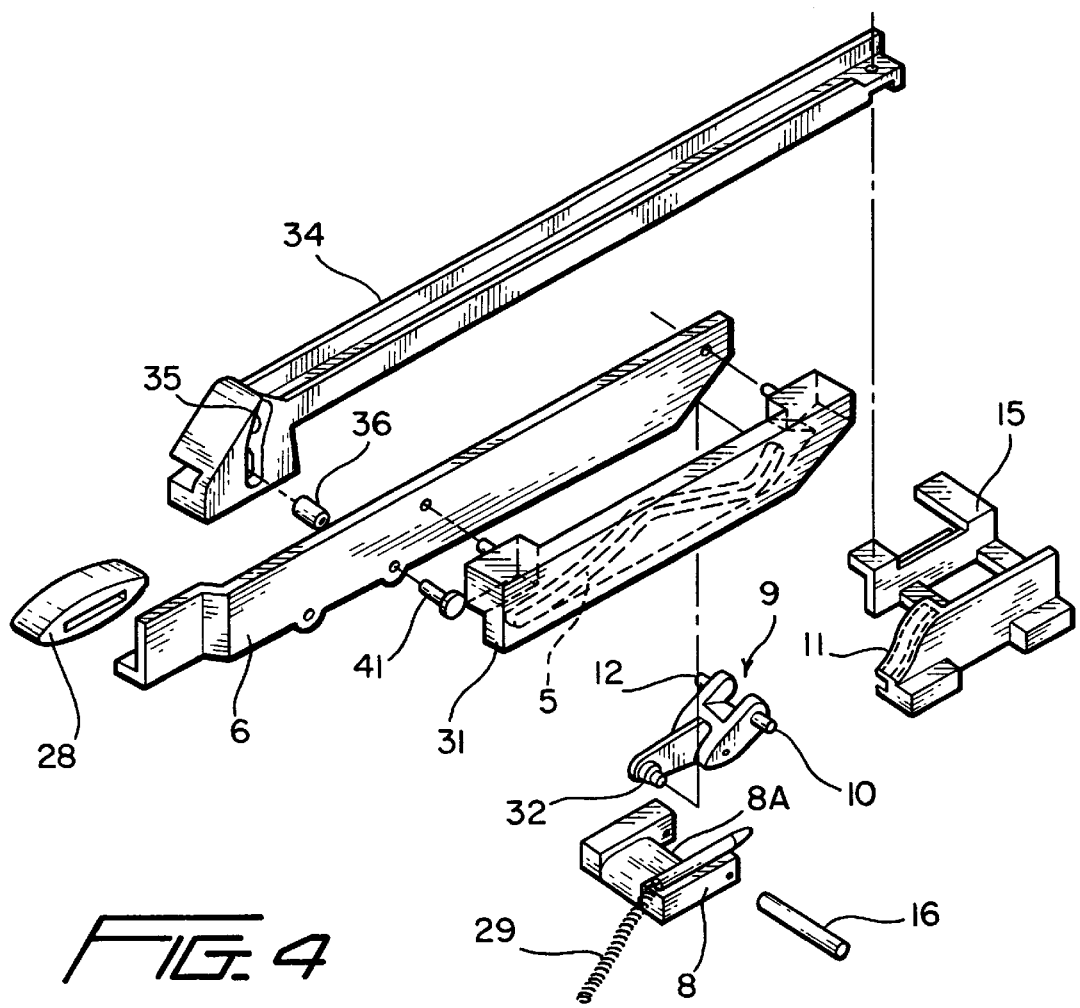
FIG. 4 is an exploded perspective view of the essential portions.

A first specific means for solving the problems according to the present invention is a slide tilt roof apparatus wherein a pair of right and left lifters (6) each having a rising/falling cam groove (5) is provided on the inner face of a panel (4) adapted to open/close an opening portion (3) of a vehicle roof, right and left guide rails (7) for longitudinally slidably guiding a front portion of the lifters (6) are fixed to the vehicle roof side, a rising/falling link (9) which is longitudinally movable by a slider (8) is supported at its intermediate and rear end portions on each of the right and left guide rails (7), the front end of the rising/falling link (9) slidably engages the rising/falling cam groove (5) of each lifter (6), the panel (4) is upwardly tilted from the closed position of the opening portion (3) by a forward movement of the rising/falling link (9), downwardly tilted from the closed position of the opening portion (3) by forwardly tilt pivoting the rising/falling link (9) while rearwardly moving it, and can be moved to its fully opened position by a rearward movement of the rising/falling link (9) from the tilt lowered position, characterized in that:

an engagement portion (10) is provided on the rear side of the rising/falling link (9), a rise/fall retaining portion (11) for rearwardly upwardly guiding the engagement portion (10) when the rising/falling link (9) forwardly tilt pivots, and retaining the rising/falling link (9) when the rising/falling link (9) is moved rearwardly, is provided on a member which is slidably guided by each guide rail (7) for longitudinal movement following the movement of the lifters (6), the rise/fall retaining portion (10) defining a guide surface (11A) for guiding the rising/falling link (9) forwardly downward so as to cause the link (9) to pivot into an erected state.

With this construction, both the forwardly tilt pivoting and the erect pivoting of the rising/falling link (9) can be achieved only by the guiding of the engagement portion (10) by the rise/fall retaining portion (11), and the rising/falling link 9 moving in the forwardly tilted posture can be retained only by the rise/fall retaining portion (11).

A second specific means for solving the problems according to the present invention is a slide tilt roof apparatus comprising, in addition to the feature of the first means, a feature such that the rising/falling link (9) is provided on its rear side with a rear support (12) adapted to slide in the corresponding guide rail (7) and with the engagement portion (10) adapted to move outside the guide rail (7) which are separately disposed on the right and left sides, the guide rail (7) is formed with a notch (13) for allowing the rear support (12) to escape upwardly of the guide rail (7) when the rising/falling link (9) forwardly tilt pivots, and the rise/fall retaining portion (11) is mounted on a support member (15) to which each end of a drip rail (14) is attached and which is adapted to be guided by the guide rail (7).

With this construction, the engagement portion (10) and the rise/fall retaining portion (11) are disposed outside the guide rail thereby allowing the rising/falling link (9) to pivot.

A third specific means for solving the problems according to the present invention is a slide tilt roof apparatus comprising, in addition to the feature of the first means or the second means, a feature such that an intermediate support (16) supporting the intermediate portion of the rising/falling link (9) is formed into a rightwardly and leftwardly projecting shape, the slider (8) is slidably supported by each of the right and left guide rails (7), and the slider (8) defines a recess (8A) for receiving the intermediate portion of the rising/falling link (9) while supporting both the right and left ends of the intermediate support (16).

With this construction, the intermediate support 16 for the rising/falling link (9) can be supported at the both ends thereof thereby stabilizing the posture of the link (9) during moving.

MODE FOR CARRYING OUT THE INVENTION

Hereinafter, embodiments of the invention will be described with reference to the drawings.

Figure 8:
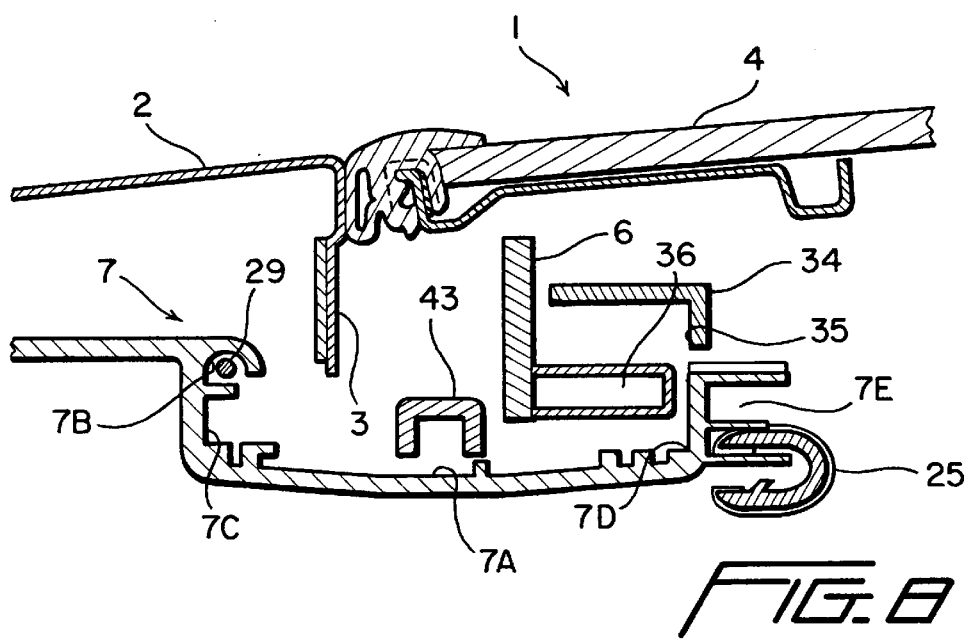
FIG. 8 is a sectional view taken along line 8—8 in FIG. 5.
Figure 6:
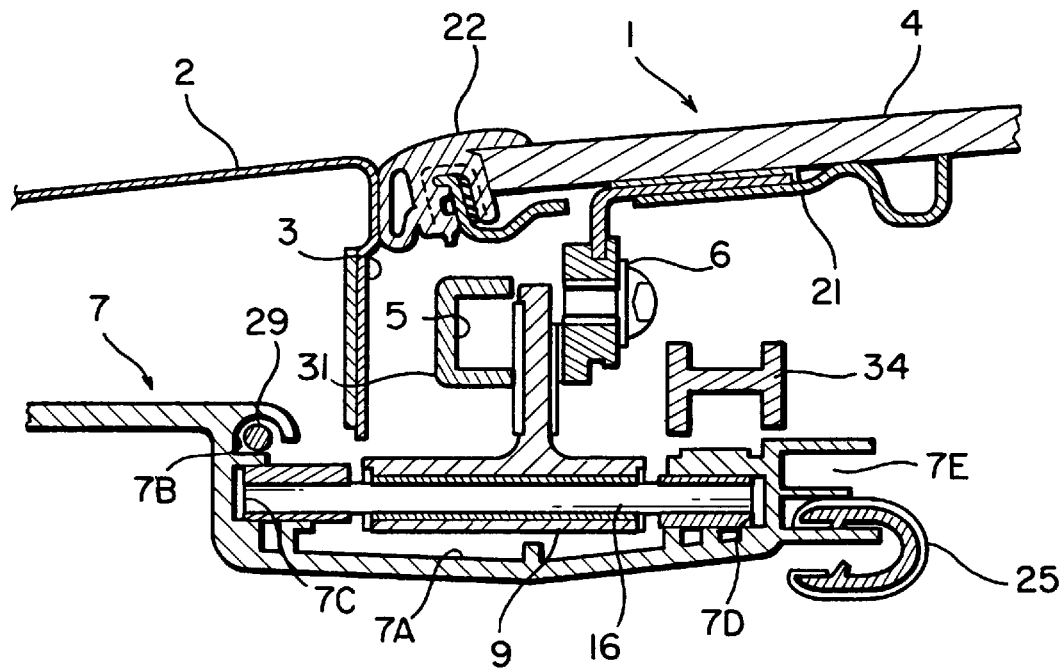
FIG. 6 is a sectional view taken along line 6—6 in FIG. 1.
Figure 7:
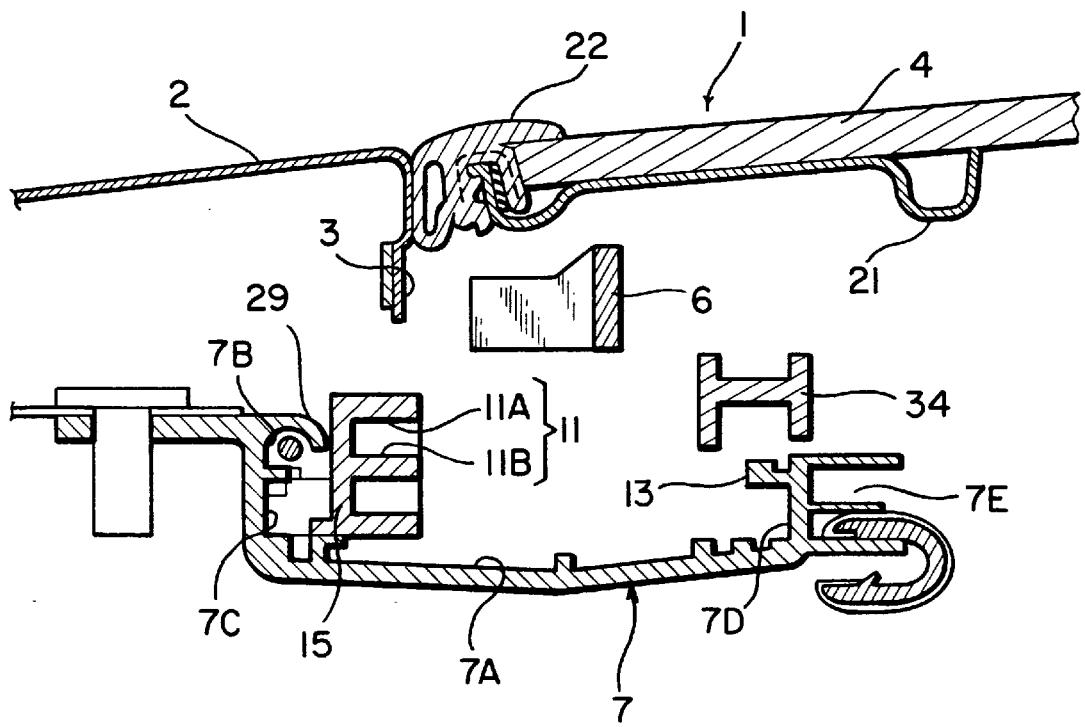
FIG. 7 is a sectional view taken along line 7—7 in FIG. 1.
Figure 9:
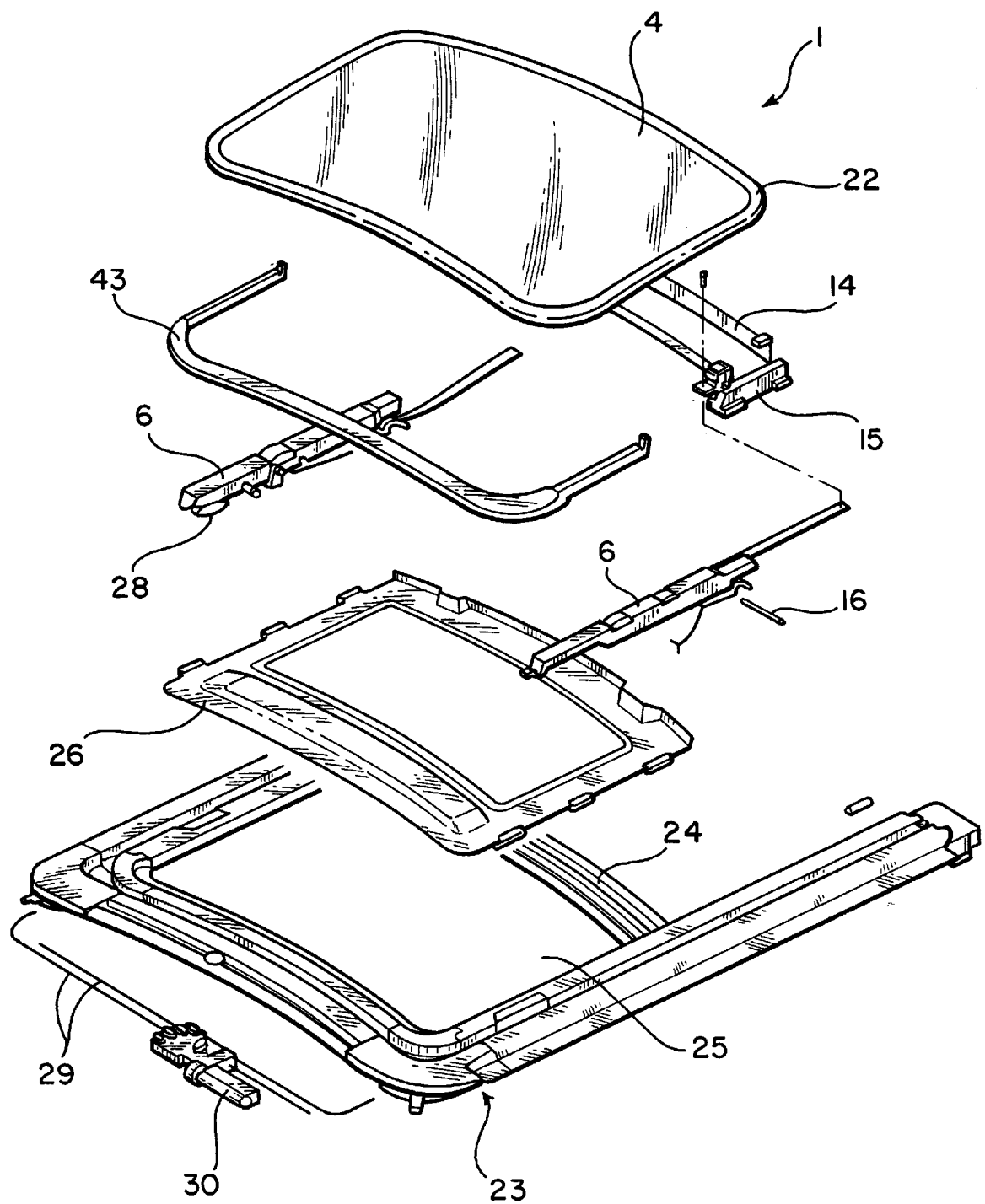
FIG. 9 is a exploded perspective view of the entire slide tilt roof apparatus.

Referring to FIGS. 1 to 9, a slide tilt roof apparatus 1 is mounted on roof 2 of a vehicle such as an automobile and is capable of changing the state of an opening portion 3 defined in the roof to closed state, ventilable state and fully opened state with use of a panel 4.

The panel 4 is formed of a transparent or colored glass or plastic, a metal plate or the like, and is fixedly attached with a metal frame 21 on a marginal portion of the inner face thereof and with a weather strip 22 on the outer periphery thereof. A lifter 6 projecting downward is mounted to each of the right and left sides of the metal frame 21.

Numeral 23 denotes a frame secured below the roof 2 which is substantially U-shaped in plan having right and left side portions and a front portion. A connection plate 24 is secured to a longitudinally intermediate portion of the frame 23. The space enclosed by the connection plate 24 and the front portion of the frame 23 forms an inner opening portion 25.

Longitudinally extending guide rails 7 are mounted on the right and left side portions of the frame 23. In each guide rail 7 are formed a trough portion 7A longitudinally extending in a widthwise central portion thereof, a cable guide groove 7B and an outer shoe guide groove 7C each situated outwardly of the trough portion 7A, an inner shoe guide groove 7D situated inwardly (on the inner opening portion 25 side) of the trough portion 7A, and a sunshade guide groove 7F situated further inwardly of the inner shoe guide groove 7D. Reference numeral 26 in FIG. 9 denotes a sunshade In the inner shoe guide groove 7D is slidably supported a front shoe (front support) 28 disposed at the front end of each lifter 6. A slider 8 extending across the inner and outer shoe guides 7C and 7D is slidably supported thereby.

The slider 8 is connected to a cable 29 extending in the cable guide groove 7B, which cable 29 can be push-pull operated by a drive unit 30 secured to a lower front surface of the frame 23.

A cam member 31 is secured to an outer rear surface of each lifter 6 and has a rising/falling cam groove 5 formed in the face thereof facing opposite the lifter 6. The rising/falling cam groove 5 comprises a closing portion 5A at a longitudinally intermediate portion thereof, a forwardly downwardly inclined tilt raising portion 5B at a front portion thereof, and a rearwardly rising tilt lowering portion 5C at a rear portion thereof.

The slider 8 defines a recess 8A on the rear side thereof for receiving an intermediate portion of the rising/falling link 9 The intermediate portion is provided with a transverse shaft (intermediate support) 16 projecting to the right and left which is supported at both ends thereof by the slider 8.

The rising/falling link 9 pivotally supported by the slider 8 is doglegged in side view and has a bifurcated rear portion for receiving the rear end of the lifter 6 and a front portion shaped into a single plate standing on edge. This front portion is inserted between the lifer 6 and the cam member 31 from below, and an upper engagement portion 32 formed by inserting a pin into the front end portion is slidably engaged with the rising/falling cam groove 5.

The rising/falling link 9 with its transverse shaft 16 projecting to the right and left is supported by the slider 8 and hence is in a condition supported by the outer and inner shoe guide grooves 7C and 7D at both sides thereof, so that the link 9 will not fluctuate transversely.

One of the right and left bifurcated ends of the rear portion of the rising/falling link 9 is provided with a rear shoe (rear support) 12 adapted to slide in the inner shoe guide 7D, while the other end is provided with an engagement portion 10 adapted to move on the inner side of the outer shoe guide groove 7C. The rear shoe 12 and the engagement portion 10 are respectively shaped like separate pins projecting to the right and left.

Reference numeral 14 denotes a drip rail, the opposite ends of which are connected to support members 15, respectively. Each of these support members 15 is longitudinally slidably supported by at least the outer shoe guide 7C and is connected to the rear end of a cooperative member 34. The cooperative member 34 defines an engagement groove 35 in a front portion thereof with which an engagement pin 36 mounted on the lifter 6 is vertically movably engaged, thereby permitting vertical movements of the lifter 6 while following longitudinal movements of the lifter cooperatively.

Each support member 15 is provided with a rise/fall retaining portion 11 positioned as projecting from the outer shoe guide groove 7C. The rise/fall retaining portion 11 faces opposite the engagement portion 10 in the transverse direction and defines a cam groove rising rearward such as to receive the engagement portion 10. The cam groove comprises an upper surface forming an upper guide surface 11A, a lower surface forming a lower guide surface 11B, and a deep portion forming a retaining portion 11C.

When the engagement portion 10 moves rearwardly, the cam groove receives the engagement portion 10, guides it rearward by the lower guide surface 11B, and retains it by the retaining portion 11C. When the engagement portion 10 moves forwardly from this retained position, the upper guide surface 11A guides the engagement portion 10 forwardly downward. The retaining portion 11C serves to confine the vertical position of the engagement portion 10 and hence may be opened rearward as long as it serves the purpose.

The inner shoe guide groove 7D in each guide rail 7 is formed with a notch 13 at a location corresponding to the position of the rise/fall retaining portion 11 assumed when the panel 4 assumes its closed position. The notch 13 allows the rear shoe 12 sliding in the inner shoe guide groove 7D to escape upwardly.

In FIGS. 1 to 3, the guide rail 7 is formed with a pair of longitudinally spaced lock grooves 40F and 40R which are capable of locking a pair of longitudinally arranged lock pins 41F and 41R provided to the lifter 6.

When the panel 4 is in the closed position, the rear lock pin 41R engages the rear lock groove 40R, while when the panel 4 is in the tilt raised position, the front lock pin 41F engages the front lock groove 40F, thus preventing the panel 4 from longitudinally shaking even when the vehicle body swings or the panel 4 undergoes wind.

When the panel 4 is in the tilt lowered position, the front and rear lock pins 41F and 41R disengage from the front and rear lock grooves 40F and 40R, thus permitting the panel 4 to move rearward.

In FIGS. 1 to 3 and 5, numeral 42 denotes a stopper fixed to the guide rail 7 and substantially L-shaped in front elevation having a vertical segment to be contacted by the front face of the cam member 31 when the lifter 6 move forward from the rear side thereby defining the foremost end position of the cam member 31, and a horizontal segment to be contacted by the slider 8 coming forward from the rear side thereby defining the foremost end position of the slider 8.

The horizontal segment of the stopper 42 supports a deflector 43 for pivotal movement which is capable of projecting upward from the opening portion 3 when the panel 4 is operated to open.

To be described next are opening and closing operations of the slide tilt roof apparatus 1 thus constructed.

As the slider 8 is moved forward from the closed position shown in FIG. 1 by means of the cable 29, the rising/falling link 9 moves forward to cause the upper engagement portion 32 to move from the closing portion 5A to the tilt raising portion 5B of the rising/falling cam groove 5, so that the panel 4 is raised to the tilt raised position depicted in phantom in FIG. 1 so as to assume a ventilable position at which the air in the vehicle can be discharged.

As the rising/falling link 9 is moved rearward by means of the slider 8 from the closed position shown in FIG. 1, the upper engagement portion 32 moves from the closing portion 5A to the tilt lowering portion 5C of the rising/falling cam groove 5 and at the same time the engagement portion 10 is received by the rise/fall retaining portion 11 and is guided upward by the lower guide surface 11B, so that the lower support 12 moves upwardly of the guide rail 7 through the notch 13.

In this operation the rising/falling link 9 forwardly tilt pivots about the transverse shaft 16, and this forwardly tilt pivoting movement in combination with the movement to the tilt lowering portion 5C causes the panel 4 to be lowered to the tilt lowered position shown in FIG. 2. At this time the engagement portion 10 is retained by the retaining portion 11C of the rise/fall retaining portion 11.

As the rising/falling link 9 is further moved rearward by means of the slider 8 from the tilt lowering position shown in FIG. 2, the lifter 6, the drip rail 14 and the support member 15, as a whole, move rearward while the engagement portion 10 is retained by the retaining portion 11C, thereby causing the panel 4 to move to the fully opened position depicted in phantom in FIG. 1.

When the panel 4 moves from the fully opened position to the fully closed position, the upper engagement portion 32 of the rising/falling link 9 causes the panel 4 to move forward by means of the lifter 6 by virtue of the fact that the tilt lowering portion 5C is shaped as rising rearward. At this time the force of the upper engagement portion 32 pressing against the tilt lowering portion 5C is directed diagonally upward, so that the sliding resistance against the rising/falling link 9 is reduced and that the position of the upper engagement portion 32 relative to the rising/falling cam groove 5 can be stably retained without any fluctuation.

As the slider 8 is moved forward from the position where the panel 4 is in the tilt lowered position shown in FIG. 2, the engagement portion 10 of the rising/falling link 9 comes off the retaining portion 11C simultaneously with the forward movement of the transverse shaft 16 and is guided forwardly downward by the upper guide surface 11A, so that the posture of the rising/falling link 9 is forcibly changed to the erected posture. This allows the upper engagement portion 32 to assuredly move from the tilt lowering portion 5C to the closing portion 5A of the rising/falling cam groove 5.

It should be noted that the foregoing embodiment is not limitative of the present invention and can be variously modified. For example, the transverse shaft 16 may be directly supported by the inner and outer shoe guide grooves 7C and 7D at both sides thereof and connected at one end thereof to the slider 8, and the front end of the lifter 6 may be supported also by the outer shoe guide groove 7C.

ADVANTAGES OF THE INVENTION

According to the present invention, as has been described, there is provided a slide tilt roof apparatus wherein an engagement portion 10 is provided on the rear side of a rising/falling link 9, a rise/fall retaining portion 11 for rearwardly upwardly guiding the engagement portion 10 when the rising/falling link 9 forwardly tilt pivots, and retaining the rising/falling link 9 when the rising/falling link 9 is moved rearwardly, is provided on a member which is slidably guided by each guide rail 7 for longitudinal movement following the movement of the lifters 6, the rise/fall retaining portion 10 defining a guide surface 11A for guiding the rising/falling link 9 forwardly downward so as to cause the link 9 to pivot into an erected state. This construction allows the rising/falling link 9 to forwardly tilt pivot as well as to pivot into the erected state by merely guiding the engagement portion 10 by means of the rise/fall retaining portion 11. Such a construction is simple, requires fewer parts and can be manufactured easily.

There is also provided a slide tilt roof apparatus, wherein the rising/falling link 9 is provided on its rear side with a rear support 12 adapted to slide in the corresponding guide rail 7 and with the engagement portion 10 adapted to move outside the guide rail 7 which are separately disposed on the right and left sides, the guide rail 7 is formed with a notch 13 for allowing the rear support 12 to escape upwardly of the guide rail 7 when the rising/falling link 9 forwardly tilt pivots, and the rise/fall retaining portion 11 is mounted on a support member 15 to which each end of a drip rail 14 is attached and which is adapted to be guided by the guide rail 7. With this construction there is no need to fix a slope surface member in the guide rail 7, so that the rising/falling link 9 moving in a forwardly tilted posture can be assuredly guided and supported in a simplified manner.

The present invention further provides a slide tilt roof apparatus wherein an intermediate support 16 supporting the intermediate portion of the rising/falling link 9 is formed into a rightwardly and leftwardly projecting shape, the slider 8 is slidably supported by each of the right and left guide rails 7, and the slider 8 defines a recess 8A for receiving the intermediate portion of the rising/falling link 9 while supporting both the right and left ends of the intermediate support 16. With this construction the intermediate support 16 supporting the rising/falling link 9 is supported at both sides and, hence, it is possible to more stabilize the posture of the rising/falling link 9 during moving and to lower the vertical positions of the slider 8 and the rising/falling link.

We claim:

1. A slide tilt roof apparatus comprising:

a panel for opening and closing an opening in a vehicle roof;

a pair of right and left lifters mounted on an inner face of said panel, each of said lifters having a rising/falling cam groove;

right and left guide rails for longitudinally slidably guiding a front portion of the lifters, said guide rails being fixed to the vehicle roof;

a rising/falling link which is supported at intermediate and rear end portions thereof on each of the right and left guide rails and which slidably engages the rising/falling cam groove of each lifter at a front end thereof;

a slider for longitudinally moving the rising/falling link forward for producing an upward tilting of the panel from a closed position, and for longitudinally moving the rising/falling link rearward and pivoting it downward at the front end for producing a downward tilting of the panel from the closed position into a lowered position, and thereafter moving the cover into a fully open position by a rearward movement of the rising/falling link;

wherein an engagement portion is provided on a rear side of the rising/falling link; wherein a rise/fall retaining portion is provided on a support member which is slidably guided by each guide rail for a longitudinal movement, the rise/fall retaining portion rearwardly upwardly guiding the engagement portion when the rising/falling link pivots downward at the front end and retaining the rising/falling link when the rising/falling link is moved rearwardly; and wherein the rise/fall retaining portion defines a guide surface for guiding the engagement portion forwardly downward, causing the link to pivot into an erected state.

2. A slide tilt roof apparatus according to claim 1, wherein one side of the rear side of the rising/falling link is provided with a rear support which is slidable along a respective one of the guide rails, and an opposite side of said rear end is provided with the engagement portion which moves outside of the respective guide rail; wherein the guide rails have an upward opening for enabling the rear support to escape upwardly out of the guide rail when rising/falling link pivots downward at the front end; and wherein the rising/falling retaining portion is mounted on the support member to which each end of a drip rail is attached and which is guided by the guide rail.

3. A slide tilt roof apparatus according to claim 2, wherein an intermediate support supporting an intermediate portion of the rising/falling link projects from right and left sides of the rising/falling link; wherein each slider is slidably supported by a respective one of the guide rails; and wherein each slider has a recess for receiving the intermediate portion of the rising/falling link while supporting ends of the intermediate support on both sides of the rising/falling link.

4. A slide tilt roof apparatus according to claim 1, wherein an intermediate support supporting an intermediate portion of the rising/falling link projects from right and left sides of the rising/falling link; wherein each slider is slidably supported by a respective one of the guide rails; and wherein each slider has a recess for receiving the intermediate portion of the rising/falling link while supporting ends of the intermediate support on both sides of the rising/falling link.

* * * * *